(12) United States Patent
Simonazzi

(10) Patent No.: US 9,358,955 B2
(45) Date of Patent: *Jun. 7, 2016

(54) BATTERY FOR ELECTRIC VEHICLES

(71) Applicant: Giuseppe Simonazzi, Reggio Emilia (IT)

(72) Inventor: Giuseppe Simonazzi, Reggio Emilia (IT)

(73) Assignee: META SYSTEM S.P.A., Reggio Emilia (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/404,512

(22) PCT Filed: May 27, 2013

(86) PCT No.: PCT/IB2013/054371
§ 371 (c)(1),
(2) Date: Nov. 28, 2014

(87) PCT Pub. No.: WO2013/179208
PCT Pub. Date: Dec. 5, 2013

(65) Prior Publication Data
US 2015/0166012 A1 Jun. 18, 2015

(30) Foreign Application Priority Data

Jun. 1, 2012 (IT) .............................. MO2012A0147

(51) Int. Cl.
*B60R 25/00* (2013.01)
*B60R 25/40* (2013.01)
(Continued)

(52) U.S. Cl.
CPC ................. *B60R 25/403* (2013.01); *B60L 7/12* (2013.01); *B60L 11/007* (2013.01); *B60L 11/184* (2013.01);
(Continued)

(58) Field of Classification Search
CPC ............ B60L 11/1846; B60L 11/1861; B60R 25/403; B60R 25/002; B60R 25/406
See application file for complete search history.

(56) References Cited

U.S. PATENT DOCUMENTS

| 5,694,335 A | 12/1997 | Hollenberg |
| 6,606,561 B2 * | 8/2003 | Flick ....................... B60R 25/04 340/988 |

(Continued)

FOREIGN PATENT DOCUMENTS

| DE | 44 32 539 | 6/1995 |
| DE | 10 2004 002949 | 8/2005 |

(Continued)

OTHER PUBLICATIONS

International Search Report dated Oct. 4, 2013, corresponding to PCT/IB2013/054371.

*Primary Examiner* — Brodie Follman
*Assistant Examiner* — Hilary L Johns
(74) *Attorney, Agent, or Firm* — Young & Thompson

(57) ABSTRACT

The battery for electric vehicles includes electric charge accumulation elements which can be connected to at least an electric motor of an electric vehicle and electronic processing elements for managing and controlling the battery and/or the electric vehicle, wherein the electronic processing elements include:
- a storage unit of an identification code of the battery and/or of the electric vehicle;
- a communication unit for communicating with an external control device;
- checking elements operatively associated with the storage unit and with the communication unit and suitable for checking if an identification code received by the communication unit and sent by the control device corresponds to the identification code stored on the storage unit;
- activation/deactivation elements for activating the battery and/or the electric vehicle if the identification code received from the external control device corresponds to the identification code stored on the storage unit.

13 Claims, 2 Drawing Sheets

(51) Int. Cl.
  *G08C 17/02*  (2006.01)
  *G07F 15/00*  (2006.01)
  *B62M 6/90*   (2010.01)
  *B60L 7/12*   (2006.01)
  *B60L 11/00*  (2006.01)
  *B60L 11/18*  (2006.01)

(52) U.S. Cl.
  CPC ......... *B60L 11/1805* (2013.01); *B60L 11/1844* (2013.01); *B60L 11/1846* (2013.01); *B60L 11/1848* (2013.01); *B60L 11/1861* (2013.01); *B60L 11/1877* (2013.01); *B60R 25/002* (2013.01); *B60R 25/406* (2013.01); *B62M 6/90* (2013.01); *G07F 15/005* (2013.01); *G08C 17/02* (2013.01); *B60L 2200/12* (2013.01); *B60L 2240/12* (2013.01); *B60L 2240/662* (2013.01); *B60L 2240/70* (2013.01); *B60L 2250/24* (2013.01); *B60L 2270/34* (2013.01); *B60L 2270/36* (2013.01); *G08C 2201/61* (2013.01); *Y02E 60/721* (2013.01); *Y02T 10/7005* (2013.01); *Y02T 10/705* (2013.01); *Y02T 10/7044* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | |
|---|---|---|---|
| 6,611,755 B1* | 8/2003 | Coffee | B28C 5/422 340/438 |
| 7,656,278 B2 | 2/2010 | Onishi et al. | |
| 2002/0067293 A1 | 6/2002 | Urushidani et al. | |
| 2004/0239502 A1* | 12/2004 | Yamauchi | H01M 2/34 340/568.1 |
| 2005/0242929 A1 | 11/2005 | Onishi et al. | |
| 2008/0018303 A1 | 1/2008 | Scheucher | |
| 2010/0185357 A1* | 7/2010 | Mizumachi | B60L 11/1816 701/31.4 |
| 2011/0270480 A1 | 11/2011 | Ishibashi et al. | |

FOREIGN PATENT DOCUMENTS

| | | |
|---|---|---|
| DE | 20 2007 016217 | 2/2008 |
| EP | 0 985 596 | 3/2000 |
| EP | 1 591 329 | 11/2005 |
| JP | 2005 297796 | 10/2005 |
| WO | 95/01269 | 1/1995 |
| WO | 2005/102799 | 11/2005 |
| WO | 2011/083361 | 7/2011 |

* cited by examiner

BATTERY FOR ELECTRIC VEHICLES

TECHNICAL FIELD

The present invention relates to a battery for electric vehicles, usable in particular for pedal-assisted electric bikes or similar vehicles.

BACKGROUND ART

The use is known and increasingly more widespread of electrically propelled vehicles.

In particular, the use is increasingly more common of pedal-assisted electric bikes, i.e., bikes wherein to the propelling action of the user is added that of an electric motor.

It is known that such electric bikes have a specific electric battery, usually located on the frame in correspondence to the saddle pillar or in correspondence to the lower tube.

The battery is connected to an electric motor, which is commonly integrated on the axis of one of the two wheels or is placed axial to the pedals.

Furthermore, from document nr. WO2011/083361 A1 an electric battery is known for vehicles having an electric charge storage battery and electronic processing means suitable for managing and controlling the use and condition of the battery itself.

In particular, the battery according to such document has a single container enclosing the storage battery and the electronic processing means and can be used to manage the free loan of the battery itself or to detect anomalous situations such as theft or unauthorised use.

The known batteries however are susceptible to further improvement.

The need is consequently felt to conceive increasingly more effective instruments able to limit or in any case detect anomalous situations such as theft or unauthorised use of the electric vehicle or even of the electric battery only.

DESCRIPTION OF THE INVENTION

The main aim of the present invention is to provide a battery for electric vehicles which allows limiting or detecting anomalous situations such as theft or the unauthorised use of the electric vehicle or even of the electric battery itself.

Another object of the present invention is to provide a battery for electric vehicles which allows to overcome the mentioned drawbacks of the state of the art in the ambit of a simple, rational, easy and effective to use as well as low cost solution.

The above objects are achieved by the battery for electric vehicles according to claim 1.

BRIEF DESCRIPTION OF THE DRAWINGS

Other characteristics and advantages of the present invention will become more evident from the description of a preferred, but not sole, embodiment of a battery for electric vehicles, illustrated purely as an example but not limited to the annexed drawings in which.

EMBODIMENTS OF THE INVENTION

With particular reference to such figures, globally indicated by 1 is a battery for electric vehicles.

Figure 1:
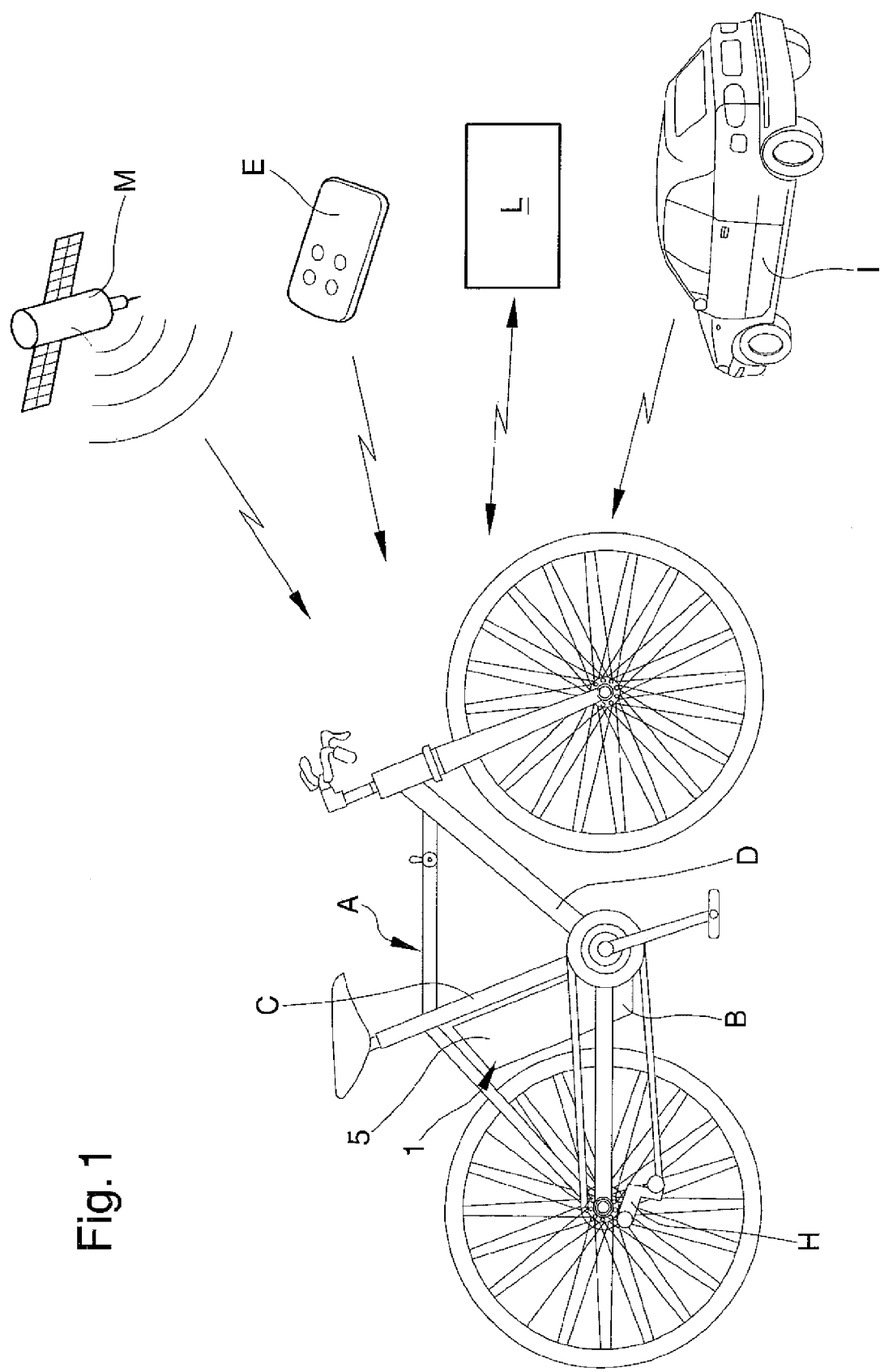
FIG. 1 is a general diagram which shows the operation of the battery according to the invention.

As schematically shown in the example of FIG. 1, the battery 1 is usable preferably for electric vehicles of the type of a pedal-assisted electric bike A. The use of battery 1 for different types of electric vehicle cannot however be ruled out.

Figure 2:
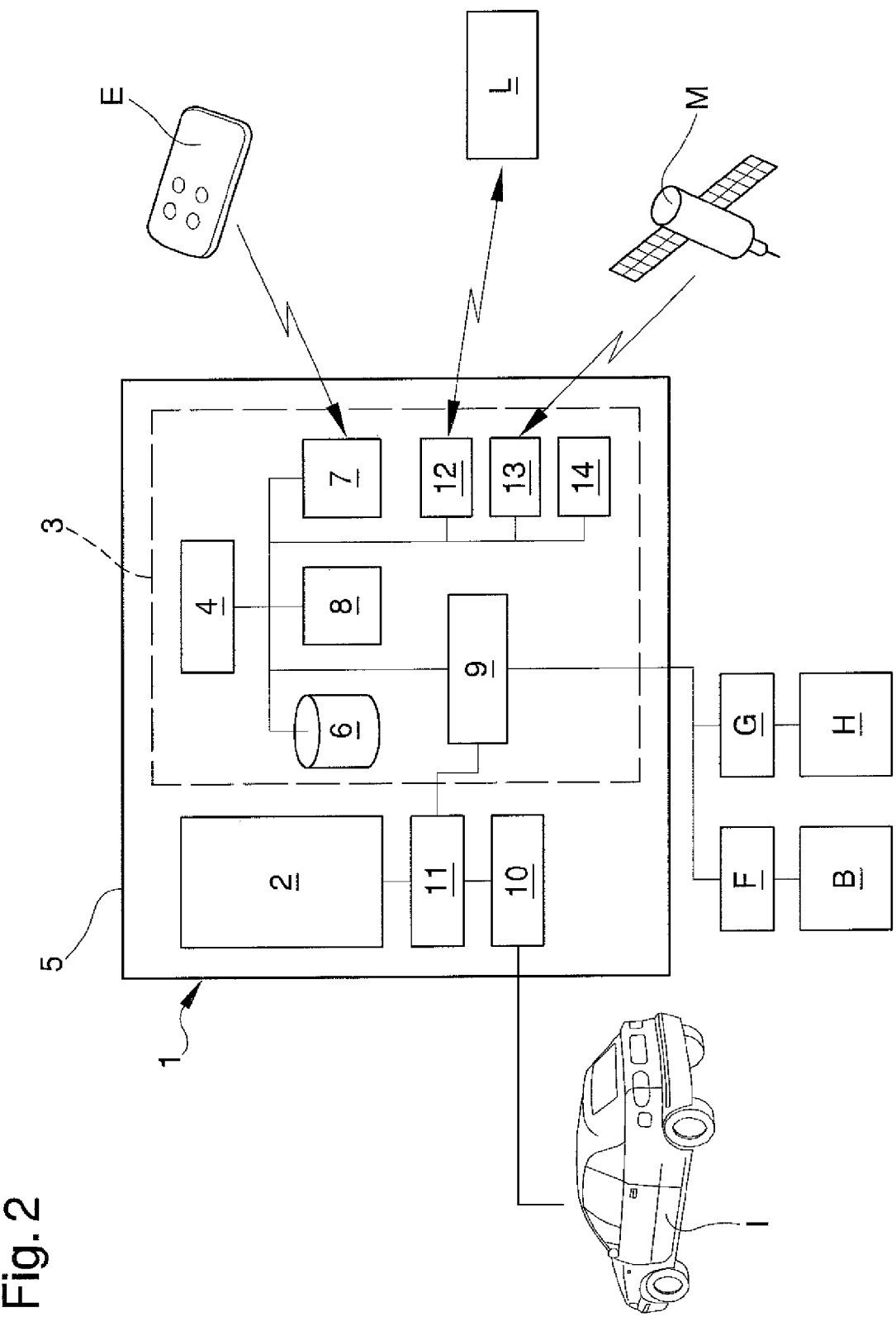
FIG. 2 is a block diagram of the battery according to the invention.

The battery 1 comprises electric charge accumulation means, schematically shown in FIG. 2 and generally indicated by the reference 2, made up of at least one storage battery of conventional type.

The storage battery 2 can be connected to the electric motor B of the electric bike A by means of the conventional power line of the bike itself.

Advantageously, the battery 1 comprises electronic processing means, generally indicated in the illustration by the reference 3, suitable for managing and controlling the battery itself or the electric bike A.

The electronic processing means 3, in particular, are suitable for limiting or in any case detecting anomalous situations such as theft or the unauthorised use of the electric bike A or also of the battery 1.

The electronic processing means 3 comprise a management and control unit, generally indicated in FIG. 1 by reference 4, which is made up, e.g., of a microprocessor or the like.

Usefully, the battery 1 comprises a single container body 5 which is suitable for containing both the storage battery 2 and the electronic processing means 3 and which can be fastened, e.g., to the pillar C of the saddle or to the lower tube D of the frame of the electric bike A.

Advantageously, the electronic processing means 3 comprise a storage unit 6 suitable for storing at least one identification code traceable in a univocal way to the battery 1 and/or to the electric bike A.

Preferably, the storage unit 6 is suitable for storing a public identification code of the electric bike A which, usefully, is also printed in correspondence to at least a portion of the bike itself, e.g., on the frame.

Advantageously, the public identification code printed on the electric bike A allows associating each electric bike A to the respective battery 1 in a univocal way.

Consequently, this represents a further deterrent for the theft of the electric bike A, of the battery 1 or of both.

The storage unit 6 is operatively connected to the management and control unit 4.

The electronic processing means 3 comprise a communication unit 7 suitable for communicating with at least a control device E external to the battery 1.

In particular, the control device E is suitable for sending an identification code in order to start and/or stop the battery 1 or the electric bike.

In one particular embodiment of the battery 1, the communication unit 7 comprises a radio-frequency receiver suitable for receiving a radio-frequency signal containing the above identification code, while the control device E is composed of a radio-frequency identification device.

For example, the control device E can be made up of a suitable transponder able to send the identification code.

In this case, a user in possession of such control device E can, by simply moving closer, deactivate all the provided anti-theft devices and thus permit the use of the electric bike A.

The electronic processing means 3 also comprise checking means 8 suitable for checking whether the identification code sent by the control device E and received by the communication unit 7 corresponds to the identification code stored on the storage unit 6.

The checking means 8, for example, can be made by means of a suitable software program managed by the management and control unit 4.

The electronic processing means 3 also comprise activation/deactivation means, schematically shown in FIG. 1 and generally indicated by the reference 9, suitable for activating the battery 1 and/or the electric bike A in the event of the identification code sent by the control device E and received by the communication unit 7 corresponding to the identification code stored on the storage unit 6.

Preferably, the activation/deactivation means 9 can be made by means of a suitable hardware and software integrated inside the battery 1.

Usefully, the activation/deactivation means 9 can be operatively connected to braking means F of the electric motor B.

Preferably, the braking means F are normally active, so as to make the electric bike A unusable.

In the event of a user, using the control device E, sending a signal containing an identification code to the communication unit 7, then:
 the management and control unit 4 checks whether the received identification code corresponds to the identification code stored on the storage unit 6;
 if the identification code corresponds, then the management and control unit 4 commands the activation/deactivation means 9 to deactivate the braking means F, thus allowing the release of the electric motor B and, therefore, the use of the electric bike A.

Furthermore, the activation/deactivation means 9 can be operatively connected to locking means G of the speed gear H of the electric bike A.

Usefully, alternatively or together with the locking means G of the speed gear H, the activation/deactivation means 9 can be operatively connected to locking means of the stand of the electric bike A.

Preferably, the locking means G of the speed gear H or of the stand are normally active, so as to make the use of the electric bike A difficult.

In the event of a user, using the control device E, sending a signal containing an identification code to the communication unit 7, then:
 the management and control unit 4 checks whether the received identification code corresponds to the identification code stored on the storage unit 6;
 if the identification code corresponds, then the management and control unit 4 commands the activation/deactivation means 9 to deactivate the locking means H, thus allowing the speed gear H to be released and, therefore, the electric bike A to be used.

Advantageously, the battery 1 comprises connection means 10 suitable for connecting the storage battery 2 to the power supply line of another vehicle, e.g., a vehicle I, to recharge the storage battery itself.

Preferably, the connection means 10 can be connected directly to the conventional cigarette-lighter socket of the vehicle I.

Usefully, a further control device E can be made up of an electronic device fitted on the vehicle I which is able to communicate with the communication unit 7.

For example, the control device E can be integrated in the ignition key of the vehicle I.

In this case, the activation/deactivation means 9 are operatively connected to disconnection means 11 suitable for disconnecting the connection means 10 from the storage battery 2.

Preferably, the disconnection means 11 are normally activated so as to prevent the electrical connection of the storage battery 2 to other vehicles.

In the event of a user, in using the control device E fitted on the vehicle I or integrated in the ignition key of the vehicle I, sending an identification code to the communication unit 7, then:
 the management and control unit 4 checks whether the received identification code corresponds to the identification code stored on the storage unit 6;
 if the identification code corresponds, then the management and control unit 4 commands the activation/deactivation means 9 to deactivate the disconnection means 11, thus permitting the connection of the storage battery 2 to the power supply line of the vehicle I and, therefore, charging the storage battery itself.

Advantageously, the electronic processing means 3 comprise an additional communication unit 12 suitable for communicating with at least one remote processing unit L.

The additional communication unit 12 comprises one or more transmitters and/or receivers operating with protocols conventionally used in the field of mobile telephones such as, e.g., GSM, GPRS, UMTS or the like.

The additional communication unit 12 also comprises at least an antenna for the transmission/receiving of signals to/from the remote processing unit L.

Alternatively, the additional communication unit 12 can be associated with one or more external antennas fitted on the electric bike A.

Usefully, the remote processing unit L can be provided with a suitable software program suitable for managing the information from the additional communication unit 12 and suitable for using such information, e.g., to check any anomalous situations such as the theft or the unauthorised use of the battery 1 or of the electric bike A or for renting the battery 1 or the electric bike A.

Usefully, the electronic processing means 3 can comprise a location device for locating the vehicle position, generically indicated in FIG. 1 by the reference 13.

The location device 13 is operatively connected to the management and control unit 4.

The location device 13, in particular, comprises at least a receiver of the satellite signal sent by M satellites, of the type used in Global Positioning System (GPS), Galileo Positioning System satellite navigation systems or the like. Usefully, the location device 13 can be used to determine the position of the battery 1 in case of theft.

Inside the battery 1, the electronic processing means 3 also comprise a measurement device for measuring the instantaneous acceleration/deceleration of the vehicle, generically indicated in FIG. 1 by the reference 14.

Preferably, the measurement device for measuring the instantaneous acceleration/deceleration 14 is made up of a 3-axis accelerometer.

The accelerometer 14 can be used, e.g., to detect changes in the inclination of the battery 1 or of the electric bike A in case of any attempt at theft.

It has in practice been ascertained how the described invention achieves the proposed objects.

In particular, the fact is underlined that the battery according to the invention permits limiting or in any case detecting anomalous situations such as theft or the unauthorised use of the electric vehicle or also of the battery itself.

The invention claimed is:

1. Battery (1) for electric vehicles, comprising electric charge accumulation means (2) which can be connected to at least an electric motor (B) of an electric vehicle (A) and electronic processing means (3) suitable for managing and controlling said battery (1) and/or said electric vehicle (A), wherein said electronic processing means (3) comprise:
- at least a storage unit (6) of at least an identification code of said battery (1) and/or of said electric vehicle (A);
- at least a communication unit (7) suitable for communicating with at least an external control device (E);
- checking means (8) operatively associated with said storage unit (6) and with said communication unit (7) and suitable for checking if at least an identification code received by said communication unit (7) and sent by said control device (E) corresponds to said identification code stored on the storage unit (6);
- activation/deactivation means (9) suitable for activating said battery (1) and/or said electric vehicle (A) if said identification code received from the external control device (E) corresponds to said identification code stored on the storage unit (6).

2. Battery (1) according to claim 1, wherein said communication unit (7) comprises at least a radio-frequency receiver suitable for receiving said identification code from said control device (E), said control device (E) being composed of a radio-frequency identification device.

3. Battery (1) according to claim 1, wherein said activation/deactivation means (9) can be associated with braking means (F) of said electric motor (B).

4. Battery (1) according to claim 1, wherein said activation/deactivation means (9) can be associated with locking means (G) of the speed gear of said electric vehicle (A).

5. Battery (1) according to claim 1, wherein said storage unit (6) is suitable for storing at least a public identification code of said electric bike (A) printed in correspondence to at least a portion of said electric bike (A).

6. Battery (1) according to claim 1, further comprising connection means (10) of said electric charge accumulation means (2) to the power supply line of at least another vehicle (I), for the recharge of said electric charge accumulation means (2).

7. Battery (1) according to the claim 6, wherein said control device (E) is made up of at least an electronic device fitted on said other vehicle (I).

8. Battery (1) according to the claim 6, wherein said control device (E) is made up of at least an electronic device integrated in the ignition key of said other vehicle (I).

9. Battery (1) according to claim 6, wherein said activation/deactivation means (9) can be associated with disconnection means (11) suitable for disconnecting said connection means (10) from said electric charge accumulation means (2) and/or from said power supply line of the other vehicle (I).

10. Battery (1) according to claim 1, wherein said electronic processing means (3) comprise at least an additional communication unit (12) suitable for communicating with at least one remote processing unit (L).

11. Battery (1) according to claim 1, wherein said electronic processing means (3) comprise at least a location device (13) for locating the position.

12. Battery (1) according to claim 1, wherein said electronic processing means (3) comprise at least a measurement device of the instantaneous acceleration/deceleration (14) of said electric vehicle (A).

13. Battery (1) according to claim 1, further comprising at least a container body (5) associable with said electric vehicle (A) and suitable for housing at least said electric charge accumulation means (2) and said electronic processing means (3).

* * * * *